(12) United States Patent
Vaarno et al.

(10) Patent No.: US 10,661,199 B2
(45) Date of Patent: *May 26, 2020

(54) METHOD OF MANUFACTURING A LAUNDER AND LAUNDER

(71) Applicant: OUTOTEC (FINLAND) OY, Expoo (FI)

(72) Inventors: Jussi Vaarno, Sundsberg (FI); Rami Saario, Espoo (FI); Henri Fredriksson, Helsinki (FI)

(73) Assignee: OUTOTEC (FINLAND) OY, Espoo (FI)

( * ) Notice: Subject to any disclaimer, the term of this patent is extended or adjusted under 35 U.S.C. 154(b) by 24 days.

This patent is subject to a terminal disclaimer.

(21) Appl. No.: 15/717,673

(22) Filed: Sep. 27, 2017

(65) Prior Publication Data

US 2018/0015388 A1    Jan. 18, 2018

Related U.S. Application Data

(62) Division of application No. 14/407,219, filed as application No. PCT/FI2013/050639 on Jun. 12, 2013, now abandoned.

(30) Foreign Application Priority Data

Jun. 26, 2012 (FI) ..................... 20125712

(51) Int. Cl.
  *B01D 11/04* (2006.01)
  *C22B 3/02* (2006.01)
  (Continued)

(52) U.S. Cl.
  CPC ........ *B01D 11/0446* (2013.01); *C22B 3/0005* (2013.01); *C22B 3/02* (2013.01);
  (Continued)

(58) Field of Classification Search
  CPC ..... B01D 11/0446; C22B 3/0005; C22B 3/02; C22B 3/22
  (Continued)

(56) References Cited

U.S. PATENT DOCUMENTS 2,258,982 A   12/1938   Gordon et al.
2,728,457 A   12/1955   Clarke
(Continued)

FOREIGN PATENT DOCUMENTS

CN   1216932 A   5/1999
CN   1216933 A   5/1999
(Continued)

OTHER PUBLICATIONS

Mexican Patent Office; 1st Office action in Mexican Patent Application No. MX/a/2014/015962; 6 pages (including translation); Mexico City, Mexico.

(Continued)

*Primary Examiner* — Scott R Kastler
*Assistant Examiner* — Michael Aboagye
(74) *Attorney, Agent, or Firm* — Chernoff, Vilhauer, McClung & Stenzel, LLP (57) ABSTRACT

A method of manufacturing a launder to be used in co-operation with a solvent extraction settler comprises manufacturing at the site of manufacture, such as in an engineering workshop, a plurality of self-supporting launder element modules, each having exterior dimensions, strength and handling and securing means conforming to shipping container standards, transporting the launder element modules to the site of installation as normal freight by transport equipment, such as trucks, trailers and container ships, capable of handling and transporting shipping container standard compatible units, and assembling at the site of installation the launder element modules into a module (Continued)

group forming a complete launder. The launder comprises a launder module group consisting of self-supporting launder element modules, each having exterior dimensions, strength and handling and securing means conforming to shipping container standards to enable shipping container standard compatible transportability.

26 Claims, 5 Drawing Sheets (51) Int. Cl.
C22B 3/26 (2006.01)
C22B 3/22 (2006.01)
(52) U.S. Cl.
CPC .............. C22B 3/22 (2013.01); Y02P 10/234 (2015.11); Y10T 29/49826 (2015.01)
(58) Field of Classification Search
USPC .......................................... 266/170; 210/322
See application file for complete search history.

(56) References Cited

U.S. PATENT DOCUMENTS

| | | | |
|---|---|---|---|
| 2,868,384 A | 1/1959 | Puddington | |
| 3,419,145 A | 12/1968 | De Celis | |
| 3,544,079 A | 12/1970 | Dressler | |
| 3,663,178 A | 5/1972 | Miller et al. | |
| 3,828,933 A | 8/1974 | Hampton et al. | |
| 3,951,817 A | 4/1976 | Snyder | |
| 4,218,311 A | 8/1980 | Newrick | |
| 4,294,702 A | 10/1981 | Finsterwalder | |
| 4,656,067 A | 4/1987 | Yetter | |
| 4,747,978 A | 5/1988 | North | |
| 5,103,641 A | 4/1992 | Maus et al. | |
| 5,266,191 A | 11/1993 | Greene et al. | |
| 5,435,924 A | 7/1995 | Albertson | |
| 5,552,050 A | 9/1996 | Valentin | |
| 5,558,780 A | 9/1996 | Vancas | |
| 5,585,008 A | 12/1996 | Ilg et al. | |
| 6,083,400 A | 7/2000 | Nyman et al. | |
| 6,132,615 A | 10/2000 | Nyman et al. | |
| 6,176,608 B1 | 1/2001 | Nyman et al. | |
| 6,245,243 B1 | 2/2001 | Meurer | |
| 6,267,900 B1 | 7/2001 | Nyman et al. | |
| 6,350,354 B1 | 2/2002 | Neuman et al. | |
| 6,432,370 B1 | 8/2002 | Nyman et al. | |
| 6,558,558 B1 | 5/2003 | Hall | |
| 6,977,038 B2 | 12/2005 | Jowett | |
| 7,390,420 B2 | 6/2008 | Nyman et al. | |
| 7,507,343 B2 | 3/2009 | San Lorenzo et al. | |
| 7,517,461 B2 | 4/2009 | Nyman et al. | |
| 7,611,635 B2 | 11/2009 | Chieng et al. | |
| 7,731,853 B2 | 6/2010 | Ekman et al. | |
| 8,858,799 B2 | 10/2014 | Nyman et al. | |
| 9,631,254 B2 | 4/2017 | Vaarno et al. | |
| 9,731,222 B2 | 8/2017 | Vaarno et al. | |
| 9,770,847 B2 | 9/2017 | Saario et al. | |
| 10,220,331 B2* | 3/2019 | Vaarno ............... | B01D 11/0446 |
| 2004/0096608 A1 | 5/2004 | King et al. | |
| 2005/0040106 A1 | 2/2005 | Gigas et al. | |
| 2005/0218072 A1 | 10/2005 | San Lorenzo et al. | |
| 2006/0113246 A1 | 6/2006 | Ekman et al. | |
| 2007/0263486 A1 | 11/2007 | Suhner | |
| 2009/0104504 A1 | 4/2009 | Roussin-Bouchard et al. | |
| 2009/0152777 A1 | 6/2009 | Kahikko et al. | |
| 2010/0051548 A1 | 3/2010 | Dorlac et al. | |
| 2010/0294715 A1 | 11/2010 | Saario et al. | |
| 2011/0236152 A1 | 9/2011 | Lu et al. | |
| 2011/0297606 A1 | 12/2011 | Vaarno | |
| 2011/0303619 A1 | 12/2011 | Nyman et al. | |
| 2012/0017006 A1 | 7/2012 | Berry et al. | |
| 2014/0110359 A1 | 4/2014 | Haywood et al. | |
| 2015/0151218 A1 | 6/2015 | Vaarno et al. | |
| 2015/0151460 A1 | 6/2015 | Saario et al. | |
| 2015/0159236 A1 | 6/2015 | Vaarno et al. | |
| 2015/0190732 A1 | 7/2015 | Vaarno et al. | |
| 2015/0190734 A1 | 7/2015 | Vaarno et al. | |
| 2015/0232960 A1 | 8/2015 | Vaarno et al. | |
| 2016/0130681 A1 | 5/2016 | Vaarno et al. | |

FOREIGN PATENT DOCUMENTS

| | | |
|---|---|---|
| CN | 2480439 | 3/2002 |
| CN | 1652853 A | 8/2005 |
| CN | 1652855 A | 8/2005 |
| CN | 2748146 Y | 12/2005 |
| CN | 1805773 A | 7/2006 |
| CN | 201071566 Y | 6/2008 |
| CN | 101449012 B | 6/2009 |
| CN | 201366254 Y | 12/2009 |
| CN | 102292133 A | 12/2011 |
| CN | 201228943 Y | 2/2012 |
| DE | 3704326 A1 | 8/1988 |
| EP | 0156699 A1 | 10/1985 |
| EP | 0430248 A2 | 6/1991 |
| EP | 0973595 B1 | 9/2001 |
| EP | 2019890 A1 | 2/2009 |
| EP | 2114548 A2 | 11/2011 |
| GB | 2341340 A | 3/2000 |
| GB | 2476102 A | 6/2011 |
| JP | 2001-29703 A | 2/2001 |
| JP | 2001029703 | 2/2001 |
| NO | 2001-5454 A | 11/2006 |
| WO | 9741938 | 11/1997 |
| WO | 1997040901 A1 | 11/1997 |
| WO | 0074895 A1 | 12/2000 |
| WO | 2003027030 A1 | 4/2003 |
| WO | 03097207 A1 | 11/2003 |
| WO | 2001135221 A1 | 11/2007 |
| WO | 2008094151 A1 | 8/2008 |
| WO | 2009004321 A2 | 1/2009 |
| WO | 2009063128 A1 | 5/2009 |
| WO | 201040048 A1 | 4/2010 |
| WO | 2010089462 A1 | 8/2010 |
| WO | 2010097516 A1 | 9/2010 |
| WO | 2010131982 A2 | 11/2010 |
| WO | 2011113110 A1 | 6/2011 |
| WO | 2011088516 A1 | 7/2011 |
| WO | 2012026345 A1 | 3/2012 |

OTHER PUBLICATIONS

Mexican Patent Office; 1st Office action in Mexican Patent Application No. MX/a/2014/015959; 8 pages (including translation); Mexico City, Mexico.

Mexican Patent Office; Office action issued in application No. MX/2018/72970; dated Aug. 31, 2018; 5 pages; Mexican Patent Office (3 page translation attached).

Canadian Intellectual Property Office; Office Action issued in Application No. 2,875,939; dated Sep. 15, 2015; 4 pgs.; Montreal, Quebec, Canada.

European Patent Office, Extended European Search Report issued in application No. 13808497, dated Feb. 11, 2016, 9 pages, European Patent Office, Munich, Germany.

European Patent Office, Extended European Search Report issued in application No. 13810173.8, dated Mar. 17, 2016, Munich, Germany.

European Patent Office; Extended European Search Report issued in application No. 13810718.0; dated Mar. 7, 2016; 6 pages; Munich, Germany.

European Patent Office; Extended European Search Report issued in application No. 13809197.0, dated Mar. 21, 2016, 9 pages, Munich, Germany.

European Patent Office; Extended European Search Report issued in application No. 13809503.9; dated Mar. 17, 2016; 6 pages; Munich, Germany.

European Patent Office; Partial Supplementary European Search Report issued in application No. 13810326.2; dated Apr. 25, 2016; 6 pages; Munich, Germany.

(56) References Cited

OTHER PUBLICATIONS

Finnish Patent and Registration Office, Finnish Search report from priority Finnish Application No. 20125714, dated Apr. 8, 2013., 1 pg.
Finnish Patent and Registration Office, Finnish Search report from priority Finnish Application No. 20125715, dated Apr. 16, 2013, 1 pg.
Finnish Patent and Registration Office, Finnish Search report from priority Finnish Application No. 20125717, dated Apr. 19, 2013, 1 pg.
Finnish Patent and Registration Office, Finnish Search report from priority Finnish Application No. 20125718, dated Apr. 19, 2013, 1 pg.
Finnish Patent and Registration Office, Opinion on Patentability issued in Application No. 20125714, dated Jan. 21, 2016, Helsinki, Finland.
International Bureau of WIPO, International Preliminary Report on Patentability issued in application No. PCT/FI2013/050640, dated Dec. 31, 2014, Geneva, Switzerland.
International Searching Authority of WIPO, Written Opinion of the International Searching Authority issued in application No. PCT/FI2013/050640, dated Sep. 20, 2013, Geneva, Switzerland.
Iinternational Bureau of WIPO, International Preliminary Report on Patentability w/ attached Written Opinion of the International Searching Authority issued in pending PCT application No. PCT/FI2013/050641, dated Dec. 31, 2014, 7 pages, World Intellectual Property Organization Geneva, Switzerland.
International Bureau of Wipo, International Preliminary Report on Patentability w/ attached Written Opinion of Ihe International Searching Authority, issued in pending PCT application PCT/FI2013/050638, dated Dec. 31, 2014, 6 pages, World Intellectual Property Organization, Geneva, Switzerland.
International Search report from corresponding International Application No. PCT/FI2013/050637, dated Oct. 9, 2013, 3 pgs.
International Search report from corresponding International Application No. PCT/FI2013/050638, dated Sep. 20, 2013, 3 pgs.
International Search report from corresponding International Application No. PCT/FI2013/050640, dated Sep. 30, 2013, 3 pgs.
International Search report from corresponding International Application No. PCT/FI2013/050641, dated Sep. 7, 2013, 3 pgs.
Miller, Graeme; Design of Mixer-Settlers to Maximize Performance:, Miller Metallurgical Services, ALTA Copper-10, May 2006, 26 pgs.
Jiang Shui Qing, Li Hai Ling, Plastic Moulding Process, Chemical Industry Publishing House, Aug. 31, 2009, pp. 172-173, Figs. 9-11.
R.J. Crawford and M.P. Kearns, Queens' University, Belfast, Introduction to the Rotational Moulding Process:, Practical Guide to Rotational Moulding, 2003, Chapter 1.
State Intellectual Property Office of the Peoples Republic of China; Notification of First Office Action issued in application No. 201380037892.6; dated Aug. 31, 2015, Beijing, China.
State Intellectual Property Office of the Peoples Republic of China, Office Action issued in Application No. 201380034067.0, dated Mar. 3, 2016, 7 Pages, Beijing, China.
State Intellectual Property Office of the People's Republic of China; First Office Action issued in application No. 201380037899.8; dated Oct. 29, 2015; 5 pages; Beijing, China.
State Intellectual Property Office of the People's Republic of China; First Office Action issued in application No. 201380034064.7, dated Nov. 3, 2015; 7 pages; Beijing, China.
State Intellectual Property Office of the People's Republic of China; Notification of First Office Action issued in Application No. 201380034124.5; dated Dec. 16, 2015; 15 pages; Beijing, China.
State Intellectual Property Office of the People's Republic of China, Office action issued in application No. 201380037888.X, dated Dec. 3, 2015, 6 pages, Beijing, China.
Taylor, Alan and Jansen, Malcolm L., "Solvent Extraction Mixer-Settler Design", Intl. Project Dev. Services Ltd., ALTA Free Paper, 10 pgs.
State Intellectual Property Office of the People's Republic of China, Notification of the Second Office Action issued in Application No. 201380034064.7, dated Aug. 15, 2016, 16 pages, Beijing, China.
European Patent Office; Extended European Search Report, issued in European Application No. 13810326.2, dated Sep. 29, 2016; 11 pages; Helsinki, Finland.

\* cited by examiner

Fig. 15 ously. Arrangements of settlers and launders are disclosed
METHOD OF MANUFACTURING A LAUNDER AND LAUNDER This is a divisional application of pending U.S. patent application Ser. No. 14/407,219, filed Dec. 11, 2016, which is a national stage application filed under 35 USC 371 based on International Application No. PCT/FI2013/050639, filed Jun. 12, 2013 and claims priority under 35 USC 119 of Finnish Patent Application No. 20125712 filed Jun. 26, 2012.

FIELD OF THE INVENTION

The present invention relates to a method of manufacturing a launder to be used in co-operation with a solvent extraction settler adapted for hydrometallurgical liquid-liquid extraction processes. Further, the invention relates to a launder.

BACKGROUND OF THE INVENTION

In a typical mixer-settler, in the first step, the aqueous and organic phases are pumped into a mixer or mixers in order to achieve a uniform liquid-liquid dispersion and a small droplet size. In the VSF® technology (stands for Vertical Smooth Flow) developed by the applicant this first step is performed in a pump-mixer called Dispersion Overflow Pump (DOP( )) (disclosed e.g. in document U.S. Pat. No. 5,662,871) and in a set of two SPIROK® helical mixers (disclosed in e.g. document U.S. Pat. No. 5,185,081). After mixing, the dispersion is fed into a settler. The settler is typically a large tank which is square in plan and its square area is about several hundred square meters. Dispersion is fed into the settler at the front end of the settler. A distributor fence is arranged at the feed end of the settler to distribute the flow of the dispersion to the whole width of the settler. In the settler, the dispersion moves towards the settler back wall and, at the same time, the phases separate by gravity into two layers with a dispersion band remaining between them. Typically, separation fences are arranged in the settler tank to enhance coalescence of the dispersion. In the VSF® technology the separation fences are so-called DDG® fences (Dispersion Depletor Gate) (disclosed e.g. in document U.S. Pat. No. 7,517,461).

At the rear end of the settler, an adjustable weir and launders are used to control the vertical position of the phase interface and to collect and discharge both phases, respectively. Arrangements of settlers and launders are disclosed also e.g. in documents WO 97/40899, WO 97/40900, WO 97/40901, WO 2009/063128 A1 and WO 2010/097516 A1.

The known launder typically comprises two launders arranged in parallel side-by-side. One of the launders is an overflow launder arranged to receive the lighter solution (e.g. organic phase) as an overflow from the settler and the other launder is an underflow launder arranged to receive the heavier solution (e.g. aqueous solution) as an underflow from the settler. The launder arrangement is made of a fiber-reinforced plastic composite by hand laminating, or by filament winding as described in WO 2010/097516 A1. WO 2009/063128 discloses that the whole launder is manufactured at a place of manufacture, such as in an engineering workshop, into a self-supporting subassembly which is transferred as a uniform entity to the site of installation where it is installed on the bottom of the settler.

So far, a solvent extraction plant including the launder has been project specified. In each case the layout of the plant and the equipment have been unique. There has not been a possibility for the productization of launders. The present launders have nonstandard transport dimensions requiring oversize transport which is expensive. Launders known in the prior art also require most of the construction work to be done at the site. This causes problems because of the crucial influence of local factors. It may be difficult to get local suppliers. It has been difficult to control the quality of the site work by local suppliers. Further, the maintenance of the present launders requires a long downtime of the whole solvent extraction settler with which the launder requiring maintenance is connected.

OBJECT OF THE INVENTION

The object of the invention is to eliminate the disadvantages mentioned above.

In particular, it is an object of the present invention to provide a method of manufacturing a modular launder and a modular launder in which the individual, in workshop pre-fabricated,—container compatible launder element modules provide shipping container standard compatible transportability, stacking capability, modularity and scalability of the launder design.

It is also an object of the present invention to provide a method for manufacturing a modular launder and a modular launder which enable that the construction work at the installation site may be kept at a minimum, resulting in low installation costs and good quality.

Further, it is an object of the present invention to provide a launder which can be easily disassembled and re-located.

Further, it is an object of the present invention to provide a launder which can be first delivered as a small-scale test or pilot launder for a pilot solvent extraction plant and later expanded into a launder for a full size solvent extraction plant.

Further, it is an object of the present invention to provide a launder which can be easily maintained.

SUMMARY OF THE INVENTION

According to a first aspect, the present invention provides a method of manufacturing a launder to be used in co-operation with a solvent extraction settler adapted for hydrometallurgical liquid-liquid extraction processes, in which method the launder is installed at the discharge end of the settler. The method comprises the steps of manufacturing at the site of manufacture, such as in an engineering workshop, a plurality of self-supporting launder element modules each having exterior dimensions, strength and handling and securing means conforming to shipping container standards; transporting the launder element modules to the site of installation as normal freight by transport equipment, such as trucks, trailers and container ships, capable of handling and transporting shipping container standard compatible units; and assembling at the site of installation the launder element modules into a module group forming a complete launder.

According to a second aspect, the present invention provides a launder to be used in co-operation with a solvent extraction settler adapted for hydrometallurgical liquid-liquid extraction processes. The launder comprises a launder module group consisting of self-supporting launder element modules each having exterior dimensions, strength and handling and securing means conforming to shipping container standards to enable shipping container standard compatible transportability.

The advantage of the invention is that the launder element modules can be manufactured in the factory environment, which is different from the installation site environment, which provides good quality. The launder modules being shipping container standard compatible units provides all benefits of the normal shipping containers: they can be handled with normal transport equipment and there is no need for oversize transport equipment. The launder element modules having dimensions, strength and handling and securing means conforming to—shipping container standards thus have all the benefits of the transportability of normal shipping containers. The launder element modules can be transported on land by trucks and trailers and with container ships by sea. In ports they can be handled with normal container handling equipment. A complete launder, which may comprise a plurality of launder element modules, can be shipped in one delivery. The modular structure enables flexible capacity since more capacity can be built while the solvent extraction plant is running by increasing the number of modules. The launder can easily be re-located and recycled by disassembling the modules at one site and reassembling them into a launder located at another site.

In an embodiment of the launder, the launder element module conforms to ISO shipping container standards to enable ISO shipping container standard compatible transportability.

In an embodiment of the launder, the launder is arranged to feed dispersion to a solvent extraction settler. In an embodiment of the launder, the launder is arranged to receive and discharge solution phases separated in the solvent extraction settler. Preferably both feeding and discharging functions are combined into a common launder element module, discharging functions serving one settler while the feeding function is serving another settler.

In an embodiment of the launder, the launder element module comprises a self-supporting framework structure having a shape of a rectangular parallelepiped with exterior dimensions and corner fittings conforming to shipping container standards, said corner fittings being attached to each corner of the framework structure. Further, the launder element module comprises a shell, said shell being supported inside the framework structure and forming at least a part of a flow path for the solutions flowing in the launder.

In an embodiment of the launder, the launder element module conforms to standard ISO 668 Series 1 "Freight containers—Classification, dimensions and ratings"; and the corner fittings conform to standard ISO 1161 Series 1 "Freight containers—Corner fittings—specification". The strength of the modules conforms to standard ISO 1496/1, Annex A. The strength of the corner fittings conforms to standard ISO 1161.

In an embodiment of the launder, the shell is a tubular hollow body made of a fibre-reinforced plastic composite. Preferably, the shell is manufactured by filament winding technology. The shells connected to each other form a gas-tight tubular flow path for the dispersion and separated solutions. The gas-tight sealed construction eliminates oxidation of the reagent by air, thus lowering make-up costs. The gas-tight construction also decreases evaporation of the reagent, decreasing the release of Volatile Organic Compounds (VOC) to the environment. Manufacturing of the shell made of a fibre-reinforced plastic composite by filament winding gives the shell a required strength. The inner surface of the shell, which in operation comes to contact with the dispersion and solvents, is inherently smooth because it is formed against a mandrel which has a smooth surface. The smooth surface contacting the solvent flow minimizes local turbulences. The smooth surface also minimizes electrostatic charging and thereby reduces the risk for fires due to igniting of volatile organic compounds in the inner atmosphere of the shell caused by electrostatic discharge. Electrostatic charging can also be reduced by adding carbon staple fibers to the plastic composite. Automated filament winding of the shell enables lower fabrication costs compared to any other manufacturing method, such as hand laminating.

In an embodiment of the launder, the module group comprises two or more launder element modules arranged in parallel and side-by-side with each other. The side-by-side arrangement of the launder element modules is advantageous because thereby the launder can be made compact and the foundation can be implemented by a plurality of pillars supporting each corner of the launder element modules. One pillar may support one to four corners of the modules.

In an embodiment of the launder, the launder element module comprises a first shell to receive and conduct a light solution phase, and a second shell to receive and conduct a heavy solution phase.

In an embodiment of the launder, the launder element module comprises a third shell adapted to feed dispersion to a next settler.

In an embodiment of the launder, the launder module group comprises a plurality of launder element modules. The first shells of the adjacently neighboring launder modules are abutting and connected to each other to form a first flow channel, and the second shells of the adjacently neighboring launder modules are abutting and connected to each other to form a second flow channel.

In an embodiment of the launder, the first shells are conical so that the sequentially connected first shells of the launder element modules in the launder module group together form a conical first flow channel.

In an embodiment of the launder, the second shells are conical so that the sequentially connected second shells of the launder element modules in the launder module group together form a conical second flow channel.

In an embodiment of the launder, the third shells are conical so that the sequentially connected third shells of the launder element modules in the launder module group together form a conical third flow channel.

The first, second and third flow channels are all tubular closed compartments which have many advantages. As an essentially closed structure the inner atmosphere of the launders can be sealed from the outer atmosphere so that mist emissions cannot escape from the atmosphere in the interior of the launders to the outer atmosphere to contaminate the air and worsen the working conditions. Likewise, the surrounding air and e.g. insects and birds cannot enter the launders. In addition, when the lighter solution is an organic phase, the oxidation degree of the organic phase decreases whereby solution costs are reduced. Further, in operation, the atmosphere of the launder above the liquid surface is flammable because it contains volatile organic compounds which are released from the hydrocarbon based solvents. The gas-tight closed compartments of the tubular shells provide fire protection against accidental fires.

The conical first and second flow channels which form discharge channels for the lighter solution (normally organic) and the heavier solution (aqueous solution) have many inlets along their length. The cross section of the conical first and second flow channels increases and the bottom is inclined downwards towards the first and second discharge boxes. After each inlet the flow rate in the first and second flow channels increases. In a conical launder the flow rate remains the same for the whole length of the launder and no return eddies and standing flows are created. Thereby crud accumulation is avoided if the solutions contain solids.

In an embodiment of the launder, the launder element module comprises a first inlet pipe having a first end opening to the inner space of the first shell and a second end opening to the settler, the second end being adapted to receive the light solution phase as an overflow from the settler.

In an embodiment of the launder, the launder element module comprises a second inlet pipe having a third end opening to the inner space of the second shell at a bottom of the second shell, and a fourth end opening to the settler, the fourth end being adapted to receive the heavy solution phase as an underflow from the settler.

In an embodiment of the launder, the overflow height position of the third end of the second inlet pipe inside the second shell is adjustable by a first level control valve to adjust the level of the heavier solution in the settler.

In an embodiment of the launder, the first level control valve comprises an actuator by which the height position of the third end of the second inlet pipe is adjustable.

In an embodiment of the launder, the launder element module comprises a feed outlet pipe having a fifth end opening to the inner space of the third shell via a second level control valve disposed at a bottom of the third shell, and a sixth end adapted to feed a solution to a settler.

In an embodiment of the launder, the launder module group comprises a box module comprising a first discharge box supported inside a framework structure for receiving and discharging the lighter solution phase from the first flow channel, and a second discharge box supported inside the framework structure for receiving and discharging the heavier solution phase from the second flow channel.

In an embodiment of the launder, the box module comprises a feed box supported inside the framework structure for feeding dispersion to the third flow channel.

The conical third channel which forms a feed launder for the dispersion has a cross section which decreases from the end connected to the feed box towards its other end which is distant from the feed box. This has the advantage that the delay time distribution of the dispersion in the feed launder is uniform so that no standing zones, in which the dispersion would separate, are formed. The bottom of the third flow channel is inclined downwards towards the feed box, whereby the aqueous solution separated from the dispersion in the feed launder flows back to the mixer via the feed box.

In an embodiment of the launder, the framework structure comprises a first end frame comprising: a horizontal first lower beam; a horizontal first upper beam at a distance from the first lower beam; a vertical first corner post which is fixedly connected to a first end of the first lower beam, defining a first corner, the vertical first corner post being fixedly connected to a first end of the first upper beam, defining a second corner; and a vertical second corner post at a distance from the first corner post, the vertical second corner post being fixedly connected to a second end of the first lower beam, defining a third corner, the vertical second corner post being fixedly connected to a second end of the first upper beam, defining a fourth corner. Further, the framework structure comprises a second end frame comprising a horizontal second lower beam; a horizontal second upper beam at a distance from the second lower beam; a vertical third corner post which is fixedly connected to a first end of the second lower beam, defining a fifth corner, the vertical third corner post being fixedly connected to a first end of the second upper beam, defining a sixth corner; and a vertical fourth corner post at a distance from the third corner post, the vertical fourth corner post being fixedly connected to a second end of the second lower beam, defining a seventh corner, the vertical fourth corner post being fixedly connected to a second end of the second upper beam, defining an eighth corner. Further, the framework structure comprises a first bottom side rail fixedly connected to the first end frame at the first corner and to the second end frame at the fifth corner; a second bottom side rail fixedly connected to the first end frame at the third corner and to the second end frame at the seventh corner; a first top side rail fixedly connected to the first end frame at the second corner and to the second end frame at the sixth corner; a second top side rail fixedly connected to the first end frame at the fourth corner and to the second end frame at the eighth corner; bottom cross members fixedly connected between and to the first and second bottom side rails; top cross members fixedly connected between and to the first and second top side rails; side cross members fixedly connected between and to the bottom side rails and the top side rails. A corner fitting is attached to each of the first corner, second corner, third corner, fourth corner, fifth corner, sixth corner, seventh corner and eighth corner.

In an embodiment of the launder, the launder comprises a foundation on which the launder module group is supported at a height above the ground level, thereby providing a space for piping and access below the settler.

In an embodiment of the launder, the foundation comprises a plurality of pillars having ISO shipping standard compatible container lashing fittings to which the corner fittings of the launder element modules can be connected. The installation of the launder on pillars has the advantage that a minimal amount of excavation work is needed. The installation on pillars also makes it possible to speed up the installation and shortens the project lead time. Pillars also allow easy assembly and disassembly of the modules and launders. When more capacity is needed for the launder, it is easy to increase capacity by simply adding more pillars for the installation of more modules. The increasing of capacity can be done with a short interruption of the process.

In an embodiment of the launder, the pillar comprises a lower end which is supported on the ground, an upper end, and one or more container lashing fittings attached to the upper end of the pillar.

In an embodiment of the launder, the container lashing fitting comprises a stacking cone.

In an embodiment of the launder, the container lashing fitting comprises a twist lock.

In an embodiment of the launder, the pillar comprises one to four container lashing fittings depending on the number of corner fittings to be connected onto the pillar.

In an embodiment of the launder, the pillar comprises a plastic tube, a concrete reinforcement arranged inside the plastic tube, cast concrete cast inside the plastic tube, and a metal base plate attached at the upper end of the pillar, to which base plate one or more container lashing fittings are fixedly connected.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIG. 8 is a view of the layout of the foundation of the settler of FIG. 1, FIGS. 9 to 12 show an axonometric view of four different types of pillars used in the foundation of FIG. 8, the pillars being equipped with stacking cones as container lashing fittings.

DETAILED DESCRIPTION OF THE INVENTION

Figure 1:
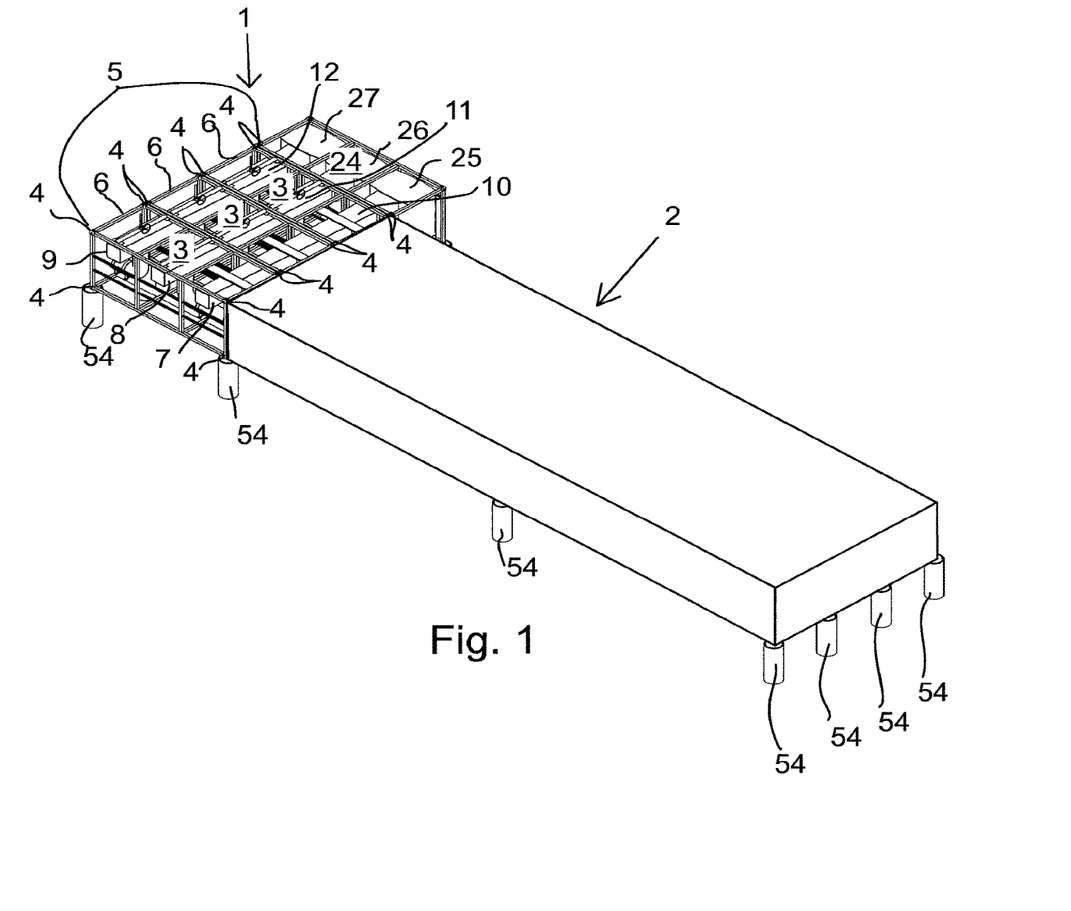
FIG. 1 is an axonometric schematic view of a solvent extraction settler equipped with a launder according to an embodiment of the present invention.

FIG. 1 shows one embodiment of a solvent extraction settler which is used in hydrometallurgical liquid-liquid extraction processes for separating solutions mixed in a dispersion into different solution phases. The launder 1 is connected to the settler 2. The dispersion pump and mixers which are used to prepare the dispersion are not shown in FIG. 1. The settler 2, which is not part of this invention, is shown only schematically. The settler 2 may be of a conventional type comprising a large tank built on the site, or it may be modular and composed of a number of prefabricated, ISO shipping container compatible settler element modules transferred and installed at the site into a complete settler as disclosed in another patent application filed in parallel with this application.

The launder 1 may have two functions. It may be arranged to feed dispersion to the settler 2 (see FIG. 4) and it may be arranged to receive and discharge the separated solutions obtained from the settler 2.

The launder 1 comprises a launder module group 5 which consists of three self-supporting launder element modules 3 and a box module 24 arranged in parallel and side-by-side with each other. Each launder element module 3 has exterior dimensions, strength and handling and securing means 4 conforming to ISO shipping container standards to enable ISO compatible transportability. The launder element module 3 comprises a self-supporting framework structure 6 having a shape of a rectangular parallelepiped with exterior dimensions and corner fittings 4 conforming to ISO shipping container standards. The corner fittings 4 are attached to each corner of the framework structure 6. The launder element module 3 conforms to standard ISO 668 Series 1 "Freight containers—Classification, dimensions and ratings"; and the corner fittings 4 conform to standard ISO 1161 Series 1 "Freight containers—Corner fittings—specification".

Shells 7, 8, 9 are supported inside the framework structure 6 and format least a part of a flow path for the solutions flowing in the launder. The shells 7, 8, 9 can be made of steel or a fibre-reinforced plastic composite. The shells 7, 8, 9 are tubular hollow bodies which are preferably made of a fibre-reinforced plastic composite and preferably manufactured by filament winding technology.

Figure 2:
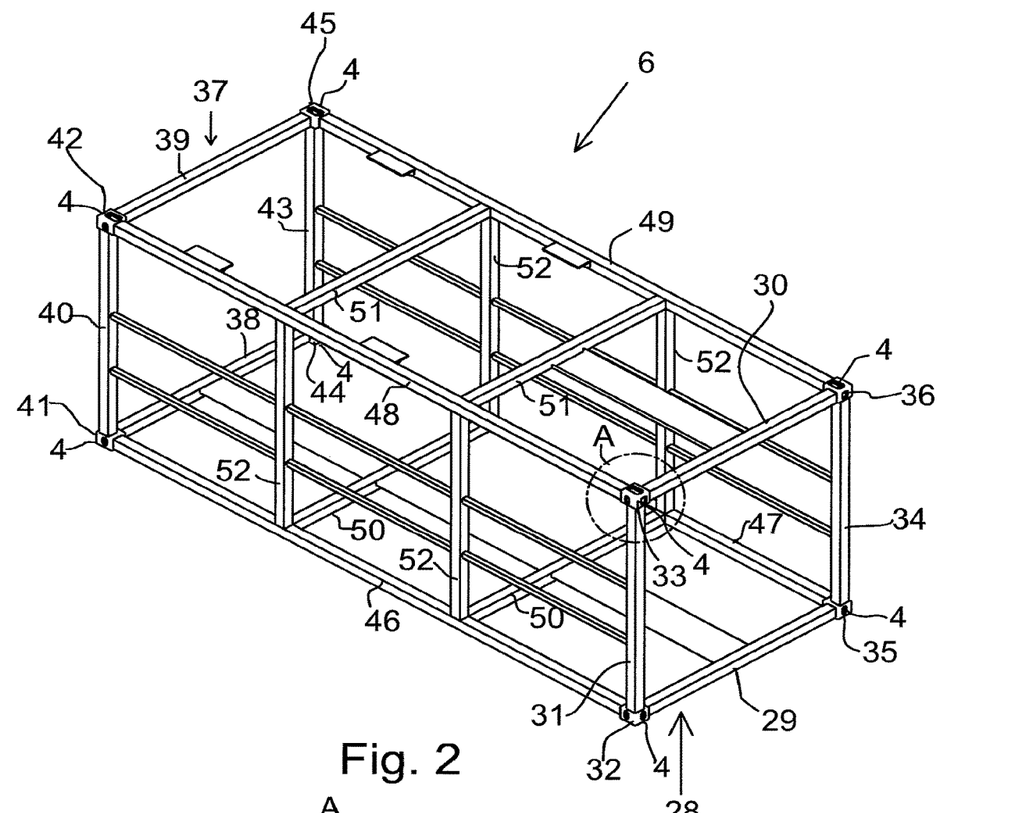
FIG. 2 is an axonometric view of the framework structure of the launder element module of FIG. 1.

As shown in FIG. 2, the framework structure 6 encompassing the shells 7, 8, 9 may have the following structure. The framework structure 6 comprises a first end frame 28. The first end frame 28 comprises a horizontal first lower beam 29, a horizontal first upper beam 30 at a distance from the first lower beam, a vertical first corner post 31 which is fixedly connected to a first end of the first lower beam 29, defining a first corner 32, the vertical first corner post 31 being fixedly connected to a first end of the first upper beam 30, defining a second corner 33, a vertical second corner post 34 at a distance from the first corner post 31, the vertical second corner post being fixedly connected to a second end of the first lower beam 29, defining a third corner 35, the vertical second corner post 34 being fixedly connected to a second end of the first upper beam 30, defining a fourth corner 36. The framework structure 6 comprises a second end frame 37. The second end frame 37 com-prises a horizontal second lower beam 38, a horizontal second upper beam 39 at a distance from the second lower beam 38, a vertical third corner post 40 which is fixedly connected to a first end of the second low-er beam 38, defining a fifth corner 41, the vertical third corner post 40 being fixedly connected to a first end of the second upper beam 39, defining a sixth corner 42, and a vertical fourth corner post 43 at a distance from the third corner post 40, the vertical fourth corner post being fixedly connected to a second end of the second lower beam 39, defining a seventh corner 44, the vertical fourth corner post being fixedly connected to a second end of the second upper beam 39, defining an eighth corner 45. A first bottom side rail 46 is fixedly connected to the first end frame 28 at the first corner 32 and to the second end frame 37 at the fifth corner 41. A second bottom side rail 47 is fixedly connected to the first end frame 28 at the third corner 35 and to the second end frame 37 at the seventh corner 44. A first top side rail 48 is fixedly connected to the first end frame 28 at the second corner 33 and to the second end frame 37 at the sixth corner 42. A second top side rail 49 is fixedly connected to the first end frame 28 at the fourth corner 36 and to the second end frame 37 at the eighth corner 45. Bottom cross members 50 are fixedly connected between and to the first and second bottom side rails 46, 47. Top cross members 51 are fixedly connected between and to the first and second top side rails 48, 49. Side cross members 52 are fixedly connected between and to the bottom side rails 46, 47 and the top side rails 48, 49. A corner fitting 4 is attached to each of the first corner 32, second corner 33, third corner 35, fourth corner 36, fifth corner 41, sixth corner 42, seventh corner 44 and eighth corner 45.

The framework structure 6 conforms to standard ISO 668 Series 1 "Freight containers—Classification, dimensions and ratings". The framework structure 6 may preferably have an external length of 6.058 m (20 ft) or 2.991 m (10 ft) and a width of 2.438 m (8 ft).

Figure 3:
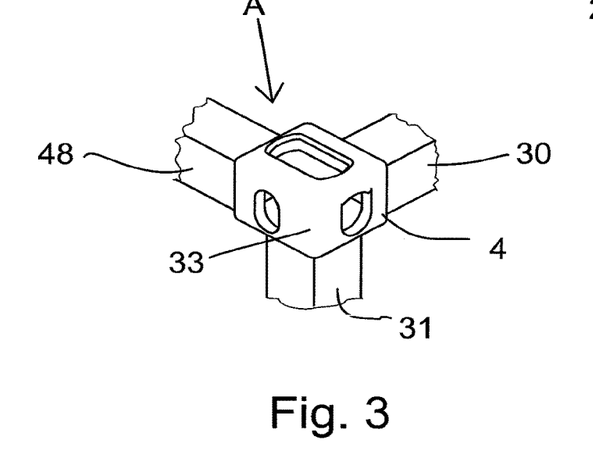
FIG. 3 is an axonometric view of detail A of FIG. 2.

FIG. 3 shows a corner fitting 4 fixedly connected to a corner of the framework structure 6. The corner fittings 4 conform to standard ISO 1161 Series 1 "Freight containers—Corner fittings—specification". The corner fitting 4 has a connecting hole at each of its three sides.

Figure 4:
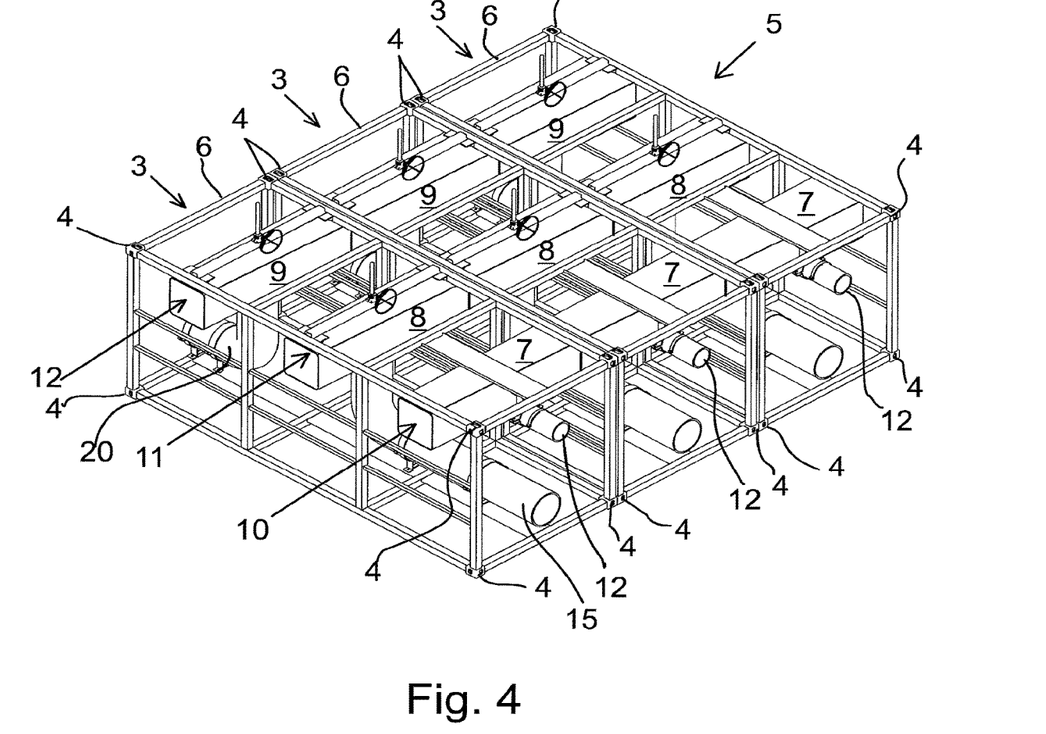
FIG. 4 is an axonometric view of three interconnected launder modules of FIG. 1.

As can be seen in FIGS. 4 to 7, each launder element module 3 comprises a first shell 7 to receive and conduct a light solution phase. Further, the launder element module 3 comprises a second shell 8 to receive and conduct a heavy solution phase. Further, the launder element module 3 comprises a third shell 9 adapted to feed dispersion to a next settler 2, as is seen in FIG. 4.

Figure 7:
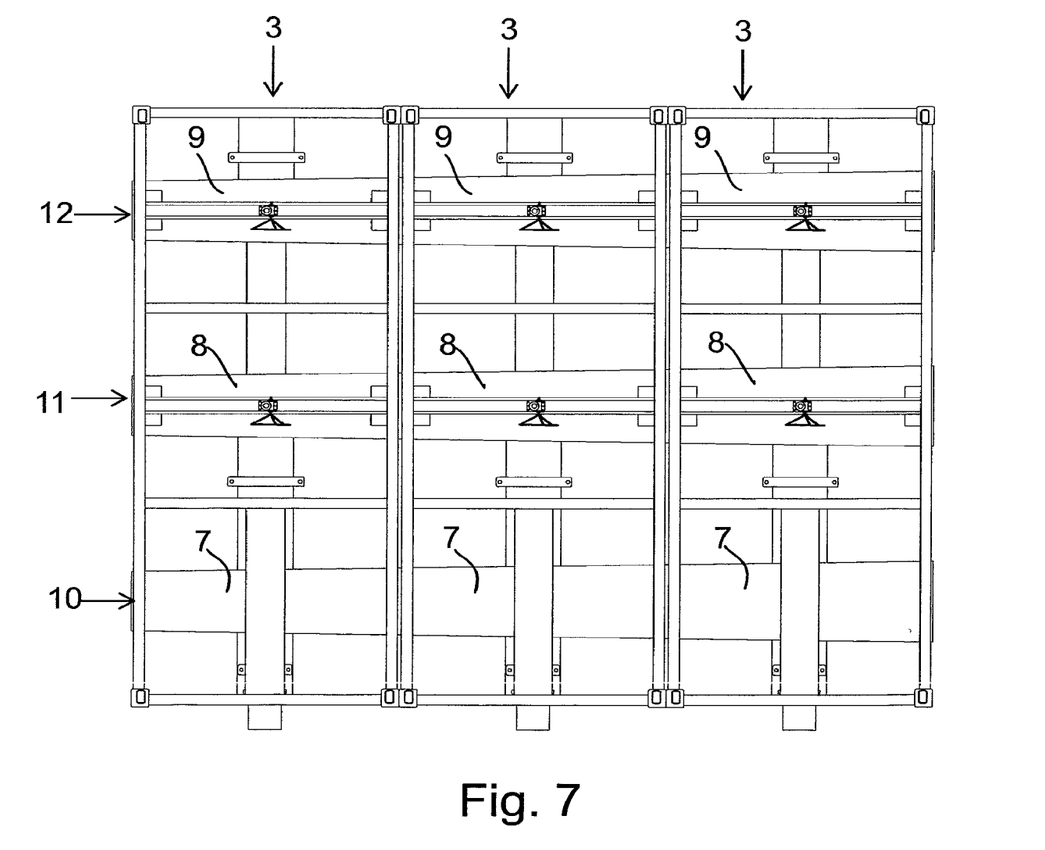
FIG. 7 is a plan view of the three interconnected launder modules of FIG. 3, seen from above.

With reference to FIGS. 4 and 7, the launder module group 5 of the shown embodiment comprises three launder element modules 3. The first shells 7 of the adjacently neighboring launder modules 3 are abutting and connected to each other to form a first flow channel 10. The second shells 8 of the adjacently neighboring launder modules are abutting and connected to each other to form a second flow channel 11. The third shells 9 of the adjacently neighboring launder modules are abutting and connected to each other to form a third flow channel 12. The first shells 7 are conical so that the sequentially connected first shells 7 of the launder element modules 3 in the launder module group 5 together form a conical first flow channel 10. The second shells 8 are conical so that the sequentially connected second shells 8 of the launder element modules 3 in the launder module group 5 together form a conical second flow channel 11. The third shells 9 are conical so that the sequentially connected third shells 9 of the launder element modules 3 in the launder module group 5 together form a conical third flow channel 12.

As seen in FIG. 1 the module group 5 comprises also a box module 24. The box module 24 comprises a self-supporting framework structure 6 having a shape of a rectangular parallelepiped with exterior dimensions and corner fittings 4 conforming to ISO shipping container standards, the corner fittings 4 being attached to each corner of the framework structure 6. A first discharge box 23 is supported inside the framework structure 6 for receiving and discharging the lighter solution phase from the first flow channel 10. The box module 24 also comprises a second discharge box 26 supported inside the framework structure 6 for receiving and discharging the heavier solution phase from the second flow channel 11. Further, the box module 5 comprises a feed box 27 supported inside the framework structure 6 for feeding dispersion to the third flow channel 12. The framework structure 6 of the box module 24 may be similar to that shown and disclosed in connection with FIG. 2.

The conical first and second flow channels 10 and 11 which form discharge channels for the lighter solution (normally organic) and the aqueous solution have many inlets along their length. The cross section of the conical first and second flow channels 10, 11 increases and their bottom is inclined downwards towards the first and second discharge boxes 25, 26. In operation, after each inlet, the flow rate in the first and second flow channels 10, 11 increases. In a conical launder the flow rate remains the same for the whole length of the launder and no return eddies and standing flows are created. Thereby crud accumulation is avoided if the solutions contain solids.

The conical third channel 12 which forms a feed launder for the dispersion has a cross section which decreases from the end connected to the feed box 27 towards its other end which is distant from the feed box 27. This has the advantage that the delay time distribution of the dispersion in the feed launder 12 is uniform so that no standing zones, in which the dispersion would separate, are formed. The bottom of the third flow channel 12 is inclined downwards towards the feed box 27 whereby the aqueous solution separated from the dispersion in the feed launder 12 flows back to the feed box and further to the mixer.

Due to the conical form of the shells 7, 8, 9 which form the flow channels 10, 11, 12, each launder element module 3 is different from the other due to different sizes of the shells 7, 8, 9. However, the system may be based on e.g. 14 standard elements which can be configured to a flow rate range of 150 to 8000 m³/h. The full length conical flow channel 10, 11, 12 may be manufactured as one piece on a mold or mandrel, and thereafter the flow channel can be cut into separate parts having lengths which fit inside the framework structure 6, and the parts are then installed inside the framework structures 6 of the launder element modules 3. The interconnection of the shells can be made by normal means and methods of connecting plastic tubes, such as by using connecting sleeves and/or by gluing the abutting ends together.

Figure 5:
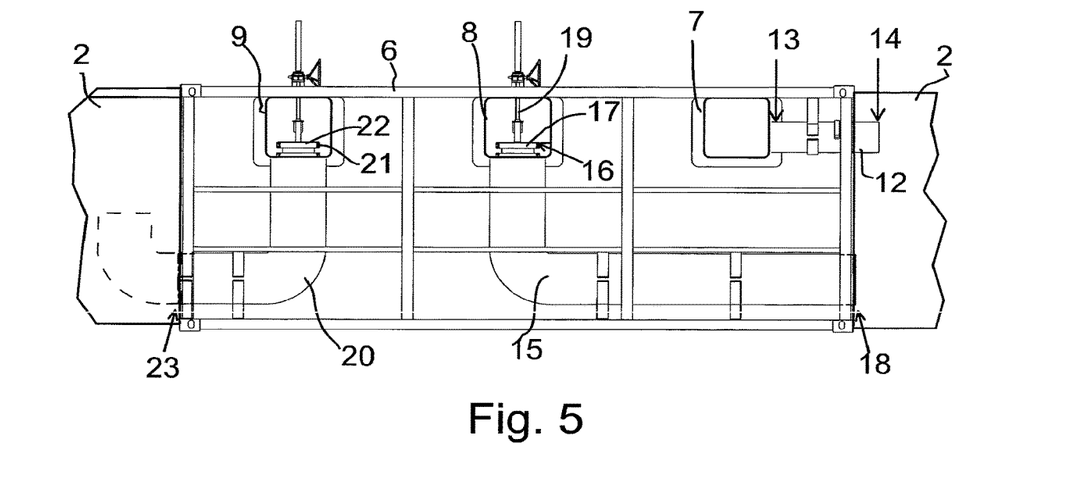
FIG. 5 is a side view of the launder module of FIG. 4.
Figure 6:
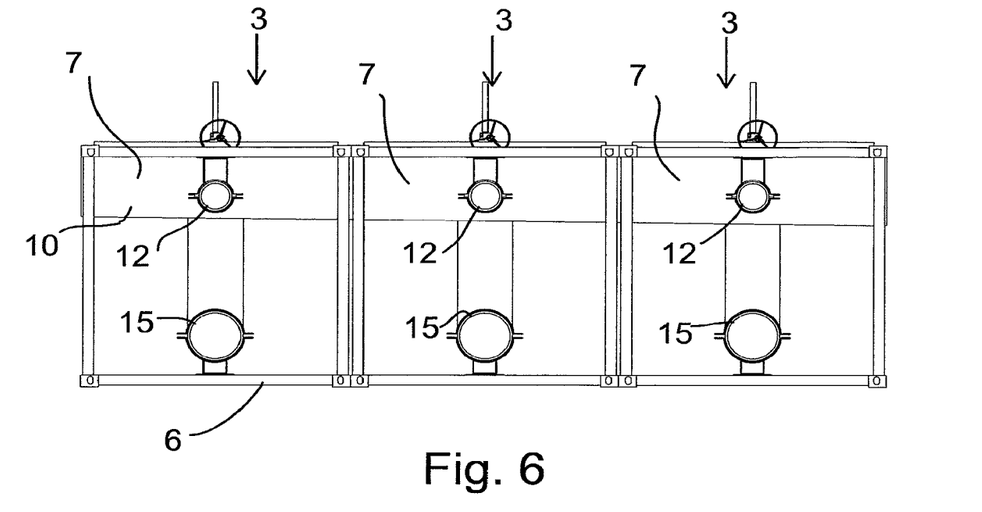
FIG. 6 is an end view of the three interconnected launder modules of FIG. 3.

Referring to FIGS. 4 and 5, the launder element module 3 comprises a first inlet pipe 12 having a first end 13 opening to the inner space of the first shell 7 and a second end 14 opening to the settler 2 on the right hand side of FIG. 4. The second end 14 is adapted to receive the light solution phase as an overflow from the settler 2 on the right hand side of FIG. 4. Further, the launder element module 3 comprises a second inlet pipe 15 having a third end 16 opening to the inner space of the second shell 8 at a bottom of the second shell 8, and a fourth end 18 opening to the settler 2. The fourth end 18 is adapted to receive the heavy solution phase as an underflow from the settler. The overflow height position of the third end 16 of the second inlet pipe 15 inside the second shell 8 is adjustable by a first level control valve 17 to adjust the level of the heavier solution in the settler 2. The first level control valve 17 comprises an actuator 19 by which the height position of the third end 16 of the second inlet pipe 15 is adjustable. Further, the launder element module 3 comprises a feed outlet pipe 20 having a fifth end 21 opening to the inner space of the third shell 9 via a second level control valve 22 disposed at a bottom of the third shell, and a sixth end 23 adapted to feed a solution to a settler 2 on the left hand side of FIG. 4.

Figure 8:
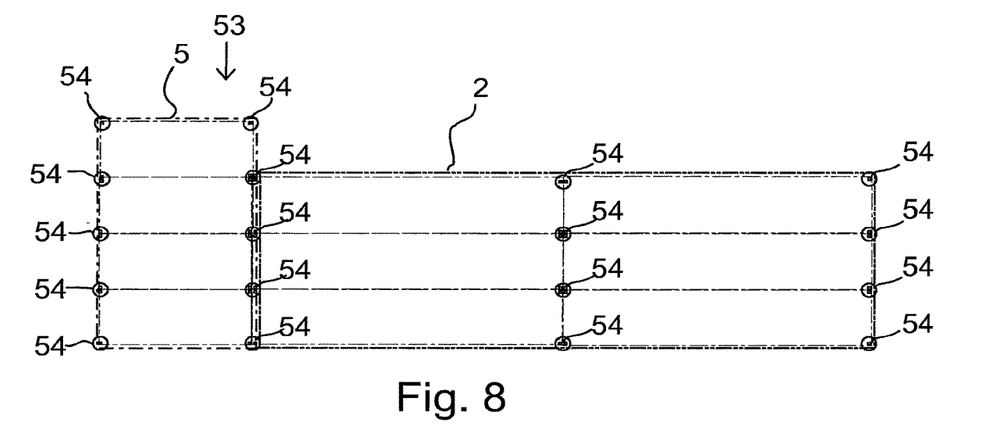

FIG. 8 shows a layout of the foundation designed for the whole settler 2 including the launder module group 5 shown in FIG. 1. The launder comprises a foundation 53 on which the module group 5 is supported at a height above the ground level, thereby providing a space for piping and access underneath the launder. The foundation 53 comprises a plurality of pillars 54 having ISO shipping standard compatible container lashing fittings 55, 56 to which the corner fittings 4 of the launder modules 3 and the box module 24 can be connected.

The pillar 54 comprises a lower end 57 which is supported on the ground, an upper end 58, and one or more container lashing fittings 55, 55 attached to the upper end 58 of the pillar 54.

Figure 9:
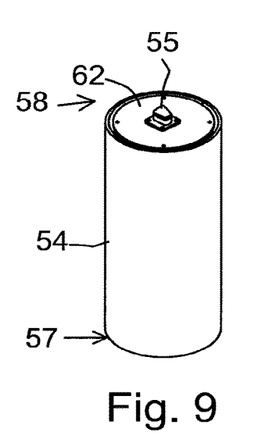
Figure 10:
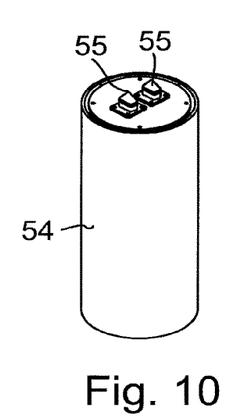
Figure 11:
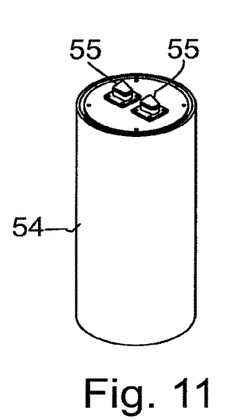
Figure 12:
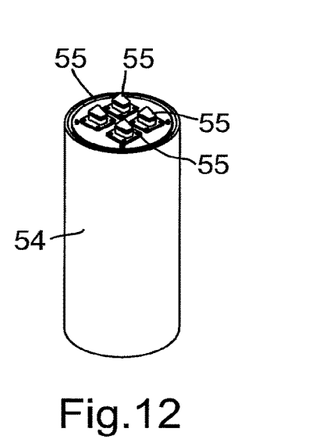
Figure 13:
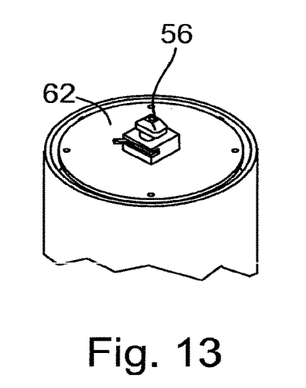
FIGS. 13 and 14 show another embodiment of the pillar equipped with a twist lock as a container lashing fitting.
Figure 14:
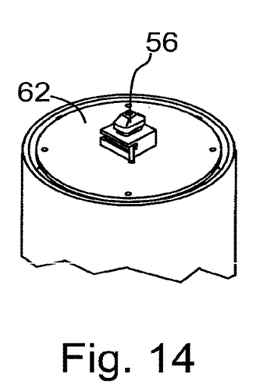
Figure 15:
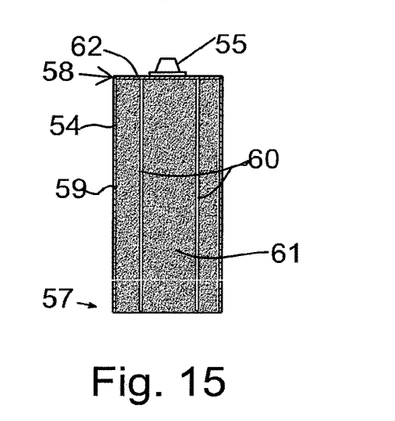
FIG. 15 shows a schematic longitudinal section of the pillar.

FIGS. 9 and 15 show that the pillar 54 comprises a lower end 57 supported on the ground and an upper end 58. One or more container lashing fittings 55, 56 are attached to the upper end 58. As illustrated in FIGS. 9 to 12, the pillar 54 may comprise one to four container lashing fittings 55, 56 depending on the number of corner fittings 4 to be connected onto the pillar. A pillar 54 supporting one corner of the module comprises only one container lashing fitting 55 (FIG. 9). A pillar 54 supporting two corners of parallel modules comprises a pair of container lashing fittings 55 arranged side by side (FIG. 10). A pillar 54 supporting two corners of sequential modules comprises a pair of container lashing fittings 55 arranged in a row (FIG. 11). A pillar 54 supporting four corners of parallel and sequential modules comprises two pairs of container lashing fittings 55 (FIG. 12). The container lashing fittings may be stacking cones 55 as shown in FIGS. 9 to 12, or alternatively, they may be twist locks 56 as shown in FIGS. 13 and 14.

With reference to FIG. 15, the pillar 54 comprises a plastic tube 59, a concrete reinforcement of metal 60 arranged inside the plastic tube 59, cast concrete 61 cast inside the plastic tube, and a metal base plate 62 attached at the upper end of the pillar, to which base plate one or more container lashing fittings 55, 56 are fixedly connected.

The launder 1 is manufactured so that that at the site of manufacture, such as in an engineering workshop, a plurality of self-supporting launder element modules 3, 24 are manufactured. Each launder element module 3, 24 has exterior dimensions, strength and handling and securing means 4 conforming to ISO shipping container standards. The launder element modules 3 are transported to the site of installation as normal freight by transport equipment, such as trucks, trailers and container ships, capable of handling and transporting ISO compatible units. At the site of installation the launder element modules 3 are assembled into a module group 5 which forms a complete launder 1.

Although the invention has been the described in conjunction with a certain type of launder, it should be understood that the invention is not limited to any certain type of launder. While the present inventions have been described in connection with a number of exemplary embodiments and implementations, the present inventions are not so limited, but rather cover various modifications and equivalent arrangements, which fall within the purview of the prospective claims.

The invention claimed is:

1. A launder capable of being installed at the discharge end of a solvent extraction settler adapted for hydrometallurgical liquid-liquid extraction processes, characterized in that the launder comprises: a launder module group consisting of self-supporting launder element modules, the launder element modules comprising a self-supporting framework structure having a shape of a rectangular parallelepiped with fittings being attached to each corner of the framework structure, and a shell which is supported inside the framework structure and forms at least a part of a flow path for solutions flowing in the launder; wherein the launder element module conforms to dimension, strength, handling, and securing requirements of standard ISO 668 Series 1 "Freight containers-Classification, dimensions and ratings"; and where the corner fittings conform to dimension, strength handling, and securing requirements of standard ISO 1161 Series 1 "Freight containers Corner fittings-specification".

2. The launder according to claim 1, where the launder is arranged to feed dispersion to a solvent extraction settler.

3. The launder according to claim 1, where the launder is arranged to receive and discharge solution phases separated in the solvent extraction settler.

4. The launder according to claim 1 where the shell is a tubular hollow body made of a fiber-reinforced plastic composite.

5. The launder according to claim 1 where the module group comprises two or more launder element modules arranged in parallel and side by side with each other.

6. The launder according to claim 1 where the launder element module comprises
   a first shell to receive and conduct a light solution phase, and
   a second shell to receive and conduct a heavy solution phase.

7. The launder according to claim 6, where the launder element module comprises a third shell adapted to feed dispersion to a next settler.

8. The launder according to claim 6, where the launder module group comprises a plurality of launder element modules, and where the first shells of adjacently neighboring launder modules are abutting and connected to each other to form a first flow channel, and the second shells of adjacently neighboring launder modules are abutting and connected to each other to form a second flow channel.

9. The launder according to claim 8, where the first shells are conical so that sequentially connected first shells of the launder element modules in the launder module group together form a conical first flow channel.

10. The launder according to claim 8, where the second shells are conical so that sequentially connected second shells of the launder element modules in the launder module group together form a conical second flow channel.

11. The launder according to claim 7 where the third shells are conical so that sequentially connected third shells of the launder element modules in the launder module group together form a conical third flow channel.

12. The launder according to claim 6 where the launder element module comprises a first inlet pipe having a first end that opens to an inner space of the first shell and a second end that opens to the settler, the second end being adapted to receive the light solution phase as an overflow from the settler.

13. The launder according to claim 6 where the launder element module comprises a second inlet pipe having a third end that opens to an inner space of the second shell at a bottom of the second shell, and a fourth end that opens to the settler, the fourth end being adapted to receive the heavy solution phase as an underflow from the settler.

14. The launder according to claim 13, where an overflow height position of the third end of the second inlet pipe inside the second shell is adjustable by a first level control valve to adjust a level of the heavier solution in the settler.

15. The launder according to claim 14, where the first level control valve comprises an actuator by which the height position of the third end of the second inlet pipe is adjustable.

16. The launder according to claim 6 where the launder element module comprises a feed outlet pipe having a fifth end opening to an inner space of the third shell via a second level control valve disposed at a bottom of the third shell, and a sixth end adapted to feed a solution to a settler.

17. The launder according to claim 15 where the launder module group-comprises a box module comprising
   a first discharge box supported inside a framework structure for receiving and discharging the lighter solution phase from the first flow channel, and
   a second discharge box supported inside the framework structure for receiving and discharging the heavier solution phase from the second flow channel.

18. The launder according to claim 17, where the box module comprises a feed box supported inside the framework structure for feeding dispersion to the third flow channel.

19. The launder according to claim 1 where the framework structure comprises
   a first end frame comprising:
     a horizontal first lower beam,
     a horizontal first upper beam at a distance from the first lower beam,
     a vertical first corner post fixedly connected to a first end of the first lower beam, defining a first corner, the vertical first corner post fixedly connected to a first end of the first upper beam, defining a second corner,
     a vertical second corner post at a distance from the first corner post, the vertical second corner post fixedly connected to a second end of the first lower beam, defining a third corner, the vertical second corner post fixedly connected to a second end of the first upper beam, defining a fourth corner,
a second end frame comprising
a horizontal second lower beam,
a horizontal second upper beam at a distance from the second lower beam,
a vertical third corner post fixedly connected to a first end of the second lower beam, defining a fifth corner, the vertical third corner post fixedly connected to a first end of the second upper beam, defining a sixth corner,
a vertical fourth corner post at a distance from the third corner post, the vertical fourth corner post fixedly connected to a second end of the second lower beam, defining a seventh corner, the vertical fourth corner post fixedly connected to a second end of the second upper beam, defining an eighth corner,
a first bottom side rail fixedly connected to the first end frame at the first corner and to the second end frame at the fifth corner-,
a second bottom side rail fixedly connected to the first end frame at the third corner and to the second end frame at the seventh corner,
a first top side rail fixedly connected to the first end frame at the second corner and to the second end frame at the sixth corner,
a second top side rail fixedly connected to the first end frame at the fourth corner and to the second end frame at the eighth corner,
bottom cross members fixedly connected between and to the first and second bottom side rails,
top cross members fixedly connected between and to the first and second top side rails,
side cross members fixedly connected between and to the bottom side rails and the top side rails,
and that a corner fitting—is attached to each of the first corner, second corner, third corner, fourth corner, fifth corner, sixth corner, seventh corner and eighth corner.

20. The launder according to claim 1 where the launder comprises a foundation on which the launder module group is supported at a height above the ground level, thereby providing a space for piping and access underneath the settler.

21. The launder according to claim 20, where the foundation comprises a plurality of pillars having container lashing fittings which are connectible to the corner fittings of the launder element modules.

22. The launder according to claim 21, where each pillar comprises a lower end supported on the ground, an upper end, and one or more container lashing fittings attached to the upper end of each pillar.

23. The launder according to claim 22, where the container lashing fitting comprises a stacking cone.

24. The launder according to claim 22, where the container lashing fitting comprises a twist lock.

25. The launder according to claim 22 where each pillar comprises at least one container lashing fitting, where the number of container lash fittings depend on the number of corner fittings to be connected onto each pillar.

26. The launder according to claim 22 where each pillar comprises a plastic tube, a concrete reinforcement arranged inside the plastic tube, cast concrete cast inside the plastic tube, and a metal base plate attached at the upper end of each pillar, to which base plate one or more container lashing fittings are fixedly connected.

* * * * *

UNITED STATES PATENT AND TRADEMARK OFFICE
CERTIFICATE OF CORRECTION

| | |
|---|---|
| PATENT NO. | : 10,661,199 B2 |
| APPLICATION NO. | : 15/717673 |
| DATED | : May 26, 2020 |
| INVENTOR(S) | : Jussi Vaarno, Rami Saario and Henri Fredriksson |

It is certified that error appears in the above-identified patent and that said Letters Patent is hereby corrected as shown below:

In the Specification

Column 1, Line 28: Replace "(DOP()" with --(DOP®)--

Signed and Sealed this
Nineteenth Day of March, 2024

Katherine Kelly Vidal
*Director of the United States Patent and Trademark Office*